United States Patent
Baghdachi et al.

(10) Patent No.: US 8,044,140 B2
(45) Date of Patent: *Oct. 25, 2011

(54) METHODS AND COMPOSITIONS FOR PIGMENTED SELF-STRATIFYING COATINGS

(75) Inventors: Jamil Baghdachi, Northville, MI (US); Heidi Rosalia Perez Hernandez, Neza (MX); Cynthia Gazepis Templeman, Ypsilanti, MI (US); Halfeng He, Ypsilanti, MI (US)

(73) Assignees: Toyota Motor Engineering & Manufacturing North America, Inc, Ann Arbor, MI (US); Eastern Michigan University, Ypsilanti, MI (US)

( * ) Notice: Subject to any disclaimer, the term of this patent is extended or adjusted under 35 U.S.C. 154(b) by 221 days.

This patent is subject to a terminal disclaimer.

(21) Appl. No.: 12/483,968

(22) Filed: Jun. 12, 2009

(65) Prior Publication Data

US 2010/0317787 A1 Dec. 16, 2010

(51) Int. Cl.
C08K 5/16 (2006.01)
C08K 3/08 (2006.01)
C08L 83/06 (2006.01)

(52) U.S. Cl. ........ 524/714; 524/588; 524/589; 524/590; 524/728

(58) Field of Classification Search .......................... None
See application file for complete search history.

(56) References Cited

U.S. PATENT DOCUMENTS

| 4,551,484 A | 11/1985 | Radisch et al. |
| 5,783,506 A | 7/1998 | Eppler et al. |
| 5,981,684 A * | 11/1999 | Bruchmann et al. ............ 528/45 |
| 6,376,637 B1 * | 4/2002 | Bruchmann et al. ............ 528/60 |
| 6,683,151 B1 | 1/2004 | Loontjens et al. |
| 6,858,678 B2 | 2/2005 | Andrist et al. |
| 7,186,772 B2 * | 3/2007 | Berkau et al. ................. 524/501 |
| 7,211,543 B2 * | 5/2007 | Nakabayashi et al. ........ 502/350 |
| 2004/0011657 A1 | 1/2004 | Muramoto et al. |
| 2006/0189750 A1 * | 8/2006 | Maier et al. .................... 524/589 |
| 2008/0213599 A1 * | 9/2008 | Webster et al. ............ 428/423.1 |
| 2008/0257212 A1 | 10/2008 | Ganapathiappan |
| 2009/0025608 A1 * | 1/2009 | Qiu .......................... 106/287.11 |
| 2010/0280148 A1 * | 11/2010 | Webster et al. ............... 523/122 |

FOREIGN PATENT DOCUMENTS

WO WO 94/26832 11/1994

OTHER PUBLICATIONS

A. Toussaint "Self-stratifying coatings for plastic substrates" Progress in Organic Coatings, 1996, 28, 183-195.*
Benjamin et al. "Self-stratifying coatings for metallic substrates" Progress in Organic Coatings, 1996, 28, 197-207.*

(Continued)

*Primary Examiner* — Robert Loewe
(74) *Attorney, Agent, or Firm* — Garrana Tran LLP; Andrea E. Tran

(57) ABSTRACT

A coating composition may include a polyol, a silsesquioxane, a polyurethane dendrimer, a crosslinker, and a pigment in contact with a dispersing agent. A process for preparing a coating composition is further disclosed including the step of contacting a polyol, a silsesquioxane, a polyurethane dendrimer, and a crosslinker to form a coating mixture dispersed within a solvent. The process further includes adding a pigment in contact with a dispersing agent to the coating mixture, and forming a self-stratifying coating having at least one layer, wherein the pigment resides substantially within one of the at least one layer.

20 Claims, 3 Drawing Sheets

OTHER PUBLICATIONS

Mike O'Donoghue et al., EIS Investigations of Alkyd and Epoxy Coatings as They are Chemically Stripped from Steel Panels, Corrosion 2003, Paper No. 03057, Nace International.

Bernd Dawid, Solvent-based and water-based systems for automotive coatings, AllBusiness.com, May 1, 1999, [published online, available at www.allbusiness.com].

* cited by examiner

METHODS AND COMPOSITIONS FOR PIGMENTED SELF-STRATIFYING COATINGS

TECHNICAL FIELD

The present disclosure relates generally to pigmented coating compositions and, more specifically, to methods of controlling the location of pigments within self-stratifying or self-layering coating compositions.

BACKGROUND

Coatings for transportation means, such as, for example, motor vehicles, airplanes and rail-mounted vehicles, may combine both functions of decoration and protection. In many circumstances, the coatings are developed to withstand extreme demands with respect to corrosion protection, scratch resistance, optics, coloring, chemical resistance, and resistance to other possible environmental effects.

Currently, coatings such as composite paints may comprise at least one multifunctional layer. For example, a composite paint such as an automotive topcoat may contain a basecoat (e.g., color coat) which is applied separately and before the application of a separate clearcoat. The functions of the top layer may include protecting coating pigments from the elements of weather, providing scratch and mar resistance, and providing gloss and the depth of field.

Typically, coatings may comprise additional constituents including pigment dispersions used to impart color. Conventional pigments utilized may include titanium dioxide ($TiO_2$), graphite, and carbon black, for example. In producing known pigmented coating compositions, particularly in multi-layered (e.g., self-stratifying or self-layering) compositions, it is uncertain whether the pigment dispersion may segregate in a particular layer or be found throughout the coating. In certain applications, it may be desirable to produce a pigmented top or intermediate film layer within a composite paint. Thus, a need exists for methods to control the location of pigments within self-stratifying or self-layering coating compositions.

SUMMARY

The following presents a general summary of several aspects of the disclosure in order to provide a basic understanding of the disclosure. This summary is not an exhaustive overview nor is it intended to identify key or critical elements of the disclosure or to delineate the scope of the claims. The following summary merely presents some concepts of the disclosure in a general form as a prelude to the more detailed description that follows.

One aspect of the disclosure is a coating composition including a polyol, a silsesquioxane, a polyurethane dendrimer, a crosslinker, and a pigment in contact with a dispersing agent.

Another aspect of the disclosure is a self-stratifying coating composition including a coating mixture comprising a polyol, a silsesquioxane, a polyurethane dendrimer, and a crosslinker. The coating composition may further include pigment particles in contact with a dispersing agent in an amount sufficient to stabilize location of the pigment particles in the coating mixture.

Yet another aspect of the disclosure is a process for preparing a coating composition including the step of contacting a polyol, a silsesquioxane, a polyurethane dendrimer, and a crosslinker to form a coating mixture dispersed within a solvent. The process may further include the steps of adding a pigment in contact with a dispersing agent to the coating mixture, and forming a self-stratifying coating having at least one layer, wherein the pigment resides substantially within one of the at least one layer.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
FIG. 1 is a photograph showing a result of elemental analysis of stratified film in an example 6 of the present disclosure.

Before the present compositions and processes are described, it is understood that the present disclosure is not limited to the particular compositions or processes described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "an," and "the" may include plural referents unless the context clearly dictates otherwise. Thus, for example, reference to "a layer" refers to one or several layers, and reference to "a process for contacting" includes reference to equivalent steps and processes known to those skilled in the art, and so forth.

The present disclosure includes embodiments, implementations and/or aspects that relate to a coating composition, methods of use and preparing thereof. As one general example of a coating composition, the composition may comprise layers including a clearcoat, a basecoat, a primer surfacer, an electrocoat, zinc phosphate and a substrate. Further, a coating composition may include constituents including monomers and a pigment dispersion, for example. Moreover, a coating composition may comprise a clearcoat having a thickness of approximately 15-150 microns, a basecoat of approximately 10-50 microns, primer surfacer having a thickness of approximately 10-150 microns, an electrocoat having a thickness of approximately 25 microns, zinc phosphate having a thickness of approximately 1-4 microns and a substrate made from steel or the like.

As used herein, "pigment", "pigment particle", or "pigment dispersion" may generally refer to an additive to the coating composition including a colorant, magnetic particle, alumina, silica, and/or other ceramic or organo-metallic, whether or not such a particulate imparts color. Thus, the present description can be used more generally to describe not only pigment colorants, but other pigments such as organometallics, ferrites, ceramics or the like.

The present disclosure describes compositions and related processes that may enable the location of a pigment within layers of the composition to be controlled based on the amounts of coating composition components utilized (to be discussed below). The self-stratifying or self-layering compositions discussed herein may result from the selective phase separation of several mutually incompatible (practically partially compatible) single-phase resins, solvents, layers, components and/or additive blends upon application and curing. Further, the self-stratifying or self-layering concepts and processes of the present disclosure are also applicable to solvent-based, waterborne and powder coatings which may require specific formulations and conditions of application and film formation.

Self-stratifying coating compositions described herein may allow the formulation of solvent-based composite systems based on blends of thermosetting polymers to produce micro-heterogeneous polymer/crosslinked polymer composites that separate into a predominately double-layer coating structure. A selective chemical reaction may occur between and among the coating composition components, examples of which include a polyol, a silsesquioxane, a polyurethane dendrimer, a crosslinker, and a pigment, as a function of time and temperature. While in liquid form, the components may form a homogeneous solution and may not be crosslinked. Also, preferential migration of certain components may occur upon curing forming a stratified coating.

The manufacture of self-stratifying coating compositions may be the result of either mutual or partial incompatibility of the composite resins (e.g., resin solid). The resins may separate into discrete phases or layers as a result of various properties, such as differing surface tensions, when they are emulsified or dispersed in a particular solvent. Due to selectivity in using certain components with varied properties such as surface tensions, the composition separates into at least two distinctive layers upon curing. The stratification of a homogeneous one-phase coating into two layers can result from removal, such as by evaporation, of the solvents which keeps the system of otherwise incompatible components in thermodynamic equilibrium. Furthermore, due to preferred and time/temperature selective crosslinking reactions among the polymer units which result in molecular growth, the equilibrium shifts and the system phase separates into two distinct layers. It is understood that crosslinking reactions as discussed herein may follow conventional reactions between primary groups (e.g., hydroxyl) and secondary groups (e.g., isocyanate).

Aspects of automotive coatings may include crosslinking compositions which, upon curing, may produce a stratified coating (e.g., clear coating). Particular to the present disclosure is the formation of self-layering or self-stratifying coating compositions (e.g., films) by contacting coating composition components including, but not limited to, a polyol, a silsesquioxane, a polyurethane dendrimer, a crosslinker, and a pigment emulsified or dispersed in a solvent. In certain aspects of the present disclosure, the polyol may be selected from a fluorinated polyol, such as a fluorinated polyether or a fluoroethylene-alkyl vinyl ether or the like. In addition, the silsesquioxane may contain an epoxy functional group and the polyurethane dendrimers may contain a hydroxyl functional group, as will be described herein. It is understood that contacting the aforementioned components may also refer to the combining, blending, mixing, or reacting of the components to produce the resultant coating composition.

Any suitable solvent including a variety of solvents typically used in coatings may be utilized to dissolve the polyol, silsesquioxane, polyurethane dendrimers and crosslinkers. In certain aspects of the disclosure, tetrahydrofuran (THF) and/or dimethylacetamide (DMA) may be used as the solvent(s) in which the components are emulsified or dispersed.

In an example of a coating composition, the solvent-emulsified and/or dispersed components may be dried to afford a solid film by applying the mixture onto a substrate followed by the application of external heat. Any suitable external heat treatment may be applied to the wet film in the range of approximately 25-125° C. for 30 minutes followed by a further heat treatment at 125-160° C. for another 30 minutes to form a crosslinked film.

As used herein, the term "polyol" is also applicable to "diol". For example, a polyether polyol is a polyol possessing a polyoxyalkylene structure composed of a polyoxyalkylene group having 2 to 10 carbon atoms and an oxygen atom as a repetitive unit. The polyol compound of the present disclosure may include a polyhydric alcohol having 2 to 12 carbon atoms, specific examples thereof may include fluorinated polyether and the like. The polyol compounds may include both low and high molecular weight polyols having weight average molecular weight in the range of approximately 2000-10,000 Dalton. Commercially available polyols may include fluorinated polyether (as Polyfox 656, Polyfox 6520 from Omnova Solutions Inc.) and a hydroxyl functional fluoro ethylene alkyl vinyl ether (as Lumiflon 200 (LF 200) and Lumiflon 910 (LF 910) from Asahi Glass co., Japan and Asahi Glass America Inc., respectively). The polyol components of the present disclosure may be used individually or in combination of two or more thereof.

For the purpose of illustration only, a representative chemical structure of a polyol such as hydroxyl functional fluoroethylene-alkyl vinyl ether, for example, is illustrated by Structure A shown below. In the present structure, R may represent any alkyl or group including, but are not limited to, methyl, ethyl, propyl, butyl, pentyl, hexyl, cyclopentyl, cyclohexyl, benzyl or phenyl groups and the like, including all their isomers, for example, tertiary butyl, isopropyl, and the like.

Structure A

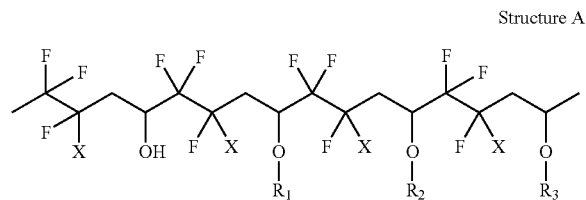

An exemplary epoxy functional silsesquioxane hybrid organic/inorganic oligomeric reactant may be prepared by contacting methyltrimethoxysilane with glycidoxypropyltrimethoxysilane in the presence of catalytic amounts of formic acid and water. Silsesquioxane may have the formula $(R)_6(C_6H_{11}O_2)_2(SiO_{1.5})_8$ wherein R may represent any alkyl or aryl group including, but are not limited to, hydrogen, methyl, ethyl, propyl, butyl, pentyl, hexyl, cyclopentyl, cyclohexyl, benzyl or phenyl groups and the like, including all their isomers, for example, tertiary butyl, isopropyl, and the like. For the purpose of illustration only, a representative chemical structure of an epoxy functional silsesquioxane such as diepoxy silsesquioxane, for example, is illustrated by Structure B shown below.

Structure B

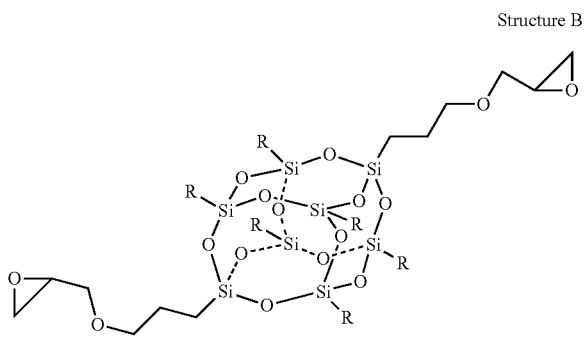

For the purpose of illustration only, a representative chemical structure of an exemplary hydroxyl-functional polyurethane dendrimer, such as an isophorone diisocyanate-based dendrimer is illustrated by Structure C shown below.

Structure C

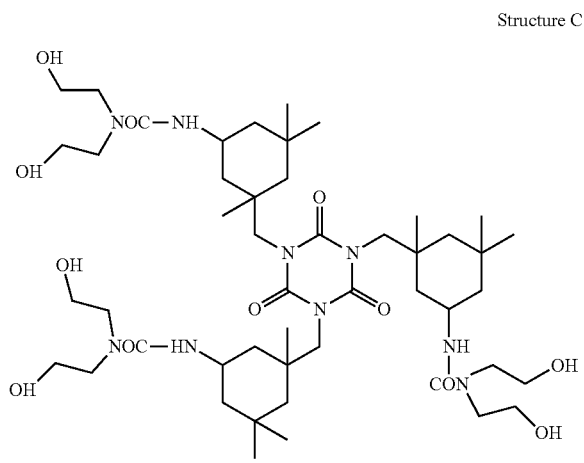

The polyurethane dendrimers of the present disclosure may be produced by following any conventional reaction procedure of producing polyurethane compounds. An example of such polyurethane dendrimer used in this disclosure can be prepared by reacting appropriate amounts of diethanolamine with a commercially available isophorone triisocyanurate (IPTI) resin at temperatures ranging from 0-20° C.

Another component in the coating composition is a crosslinker, which can react with both the aforementioned polyol and the hydroxyl-functional polyurethane dendrimer. A representative general chemical structure of a crosslinker, such as a hexamethylene diisocyanate (HDI) crosslinker, is shown below as Structure D. Possible crosslinkers may include, but are not limited to HDI, hexamethylene triisocyanate (HTI), methylene bis-(4-cyclohexyl isocyanate) (HMDI) and a combination thereof.

Structure D

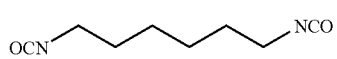

The reaction of hydroxyl compounds with isocyanate compounds is generally known. The current disclosure employs hydroxyl compounds that have different reactivity towards crosslinkers such as di- and triisocyanates. Examples of the before-mentioned isocyanate compounds may include polyfunctional isocyanate compounds such as diisocyanate and triisocyanates, for example, isophorone diisocyanate (IPDI), isophorone triisocyanate (IPTI), hexane diisocyanate and the like. In general, catalysts used in such reactions may include metal-organic compounds such as tin, titanium reaction products and certain tertiary amine compounds. Examples of catalysts may include 1,4-diazabicyclo[2.2.2]octane (DABCO), triethylamine and the like. The amount of catalysts utilized varies based on the reactants, formulation variables, types of both crosslinker and polyols as well as desired cure speed. The preferred amounts range from 0.01-5% by weight based on the total resin solids of the formulated product.

To impart color to a coating composition, a pigment or various additives may be optionally added to at least one or a combination of the aforementioned coating composition components. All organic, inorganic pigments, and/or additives known in the art may be incorporated in the disclosed self-stratifying coating(s). Examples of inorganic pigments may include titanium dioxide ($TiO_2$) (e.g., white), iron oxide (e.g., red, yellow, magnetic, coated flake), aluminum oxide, iron complexes (e.g., green, blue), or the like. Organic pigments such as quinacridone (e.g., red, purple), carbazole violet, phthalocyanine (e.g., green, blue), carbon black, mica flakes, or azo based compounds (e.g., yellow, orange shade, nickel complex yellow, quinazolinedione-azo yellow, benzimidazolone yellow, orange azo) can also be incorporated into pigments as used herein. Other examples of pigments may include, but are not limited to, indanthrone (e.g., blue), tetrachloroisoindolinone (e.g., yellow), diketopyrrolo-pyrrole (e.g., red), perylene (e.g., maroon, violet), quinacridone (e.g., magenta), vanadate (e.g., yellow bismuth), titanate (e.g., nickel yellow, chrome gold), silicon dioxide, zinc oxide, cerium oxide, talc, barium sulfate, glass, coated glass, cholesteric liquid crystal pigments, other flake-like interference pigments, bismuth oxychloride, calcium carbonate, and clays (e.g., bentonite and montmorillonite). When pigments are intended to be added to at least one coating composition component previously mentioned, the pigments may added at a concentration of about 5-50% by weight relative to the coating composition component (e.g., resin solid).

If used as a pigment, $TiO_2$ may be found in various crystalline structures or forms such as in rutile, pure, or anatase form. In general, all varieties of surface encapsulated and/or treated rutile grade titanium dioxide may be utilized. Various methods exist for preparing a $TiO_2$ dispersion or $TiO_2$, including in nanoparticle form, that may provide $TiO_2$ in powder form. $TiO_2$ may be dispersed in an appropriate solvent (e.g., water, organic solvent, inorganic solvent) and formulated with other possible additives to improve properties such as coating adhesion, dispersibility and the like. Various treatments are further contemplated including reacting with a wide variety of silane and silicon, aluminum oxide and other inert organic and inorganic materials.

During the manufacture of certain pigments such as titanium dioxide ($TiO_2$), for example, a surface treatment (i.e., surface coating) may be provided on the pigment to promote dispersibility. Examples of commonly used surface treatments may include silica, alumina, or the like.

Furthermore, pigments may be contacted (e.g., ground, mixed, etc.) with the aforementioned coating composition components, such as polyurethane polyol dendrimer or silsequioxane, utilizing various conventional dispersing agents. As such, polyurethane polyol dendrimer and silsequioxane are provided as examples of grinding resins. However, it should be understood that any conventional grinding resin may utilized with the disclosed pigments and/or dispersing agents. Examples of dispersing agents (i.e., wetting agents) utilized with the pigment(s) disclosed herein may include, but are not limited to, an acrylic polymer solution, polycarboxylic acid polymer and polysiloxane copolymer solution, and hydroxyl-functional carboxylic acid ester. The grinding of the pigment(s) with a dispersing agent may occur in any suitable medium such as water, resin, organic solvent/co-solvents, or the like. Such dispersing agents may improve pigment wetting, reduce the time required to grind the pigment within a dispersion and stabilize the pigment dispersion. Further results of utilizing such dispersing agents may be the improvement of coating gloss and leveling, while reducing viscosity and the occurrence of flooding and floating of the coating composition. Terms such as "dispersing agent" and "dispersing additive" may be used interchangeably herein to refer to any additive to be used in contact with a pigment to form a pigment dispersion.

In some embodiments, an acrylic polymer or polyacrylate, such as dipropylene glycol monomethyl ether, may be utilized as a dispersing agent. Such polymer may exist in a deprotonated carboxylic acid form. The acrylic polymer may be a leveling additive and as such, may improve leveling of the coating. Further, the acrylic polymer may produce no effect on the surface tension of the coating composition.

Another illustrative dispersing agent of the present disclosure may be a polycarboxylic acid polymer and polysiloxane copolymer solution. Specifically, the aforementioned dispersing agent may comprise a 50% solution of a partial amide and alkylammonium salt of a lower molecular weight unsaturated polycarboxylic acid polymer and polysiloxane copolymer in xylene/isobutanol. Commercial grade red iron oxide, for example, can be dispersed using from about 1-4% of pigment weight of a variety of pigment dispersants selected from a group of low to high molecular weight acrylic copolymers and their salts. For example, the use of 1.2% solution of a partial amide and alkylammonium salt of a lower molecular weight unsaturated polycarboxylic acid polymer and polysiloxane copolymer in xylene/isobutanol dispersing agent (from BYK Chemie) may result in a completely dispersed iron oxide in both silsesquioxane and the dendimer, which in turn results in a stratified coating. A typical composition of a pigment portion of a self-stratified coating at 10% iron oxide level is shown Table 1 (below).

| | |
|---|---|
| Dendrimer (30%) | 16.66 g |
| N,N-dimethylacethamide | 3.4 g |
| Iron oxide | 7.8 g (10%) |
| solution of an alkylolammonium salt of a polyfunctional polymer with anionic/non-ionic character | 1.12 (4%) |

Another example of a possible dispersing agent may be a cationic dispersing agent such as a hydroxyl-functional carboxylic acid ester comprising at least one pigment affinic group. The hydroxyl-functional carboxylic acid ester may be developed for use with solvent based paints or coatings, particularly to stabilize organic or inorganic pigments such as titanium dioxide ($TiO_2$), extenders or the like. While typical dispersing agents may be used within a solvent, the hydroxyl-functional carboxylic acid ester may also function in the absence of a medium or solvent.

The aforementioned dispersing agents or surface treatments may affect the location of where the pigments reside within the self-stratifying coating composition. Generally, through the selection of one or a combination of dispersing agents and/or surface treatments, the location of the pigment in the final stratified coating may be controlled and/or stabilized.

As provided in Examples 6-11, the use of $TiO_2$ pigment surface treatments, such as alumina and silica, may typically produce self-stratifying coatings with the pigmented layer mainly segregated in the bottom layer(s). As another example, the use of pigments which lack surface treatments, particularly pigments in contact with an acrylic copolymer dispersing agent (e.g., dipropylene glycol monomethyl ether) may produce a coating composition with a pigmented layer residing substantially in one of the multiple layers, such as the upper layer(s) in the present example. To this end, contacting the pigment particle(s) with a dispersing agent may stabilize the location of the pigment particle(s) within the upper layer, for example, of the coating composition mixture.

The coating composition may be applied immediately on a substrate after it is produced by contacting a fluorinated polyol, an functionalized silsesquioxane, polyurethane dendrimer, a solvent and any catalyst or additives, if necessary. The self-stratifying coating can be applied by a wide variety of techniques including brushing, roll coatings, spray, drawdown methods and the like. In general, the stratification may not be affected by the application method. While any film thickness in the range of approximately 0.1-10 mils or 2.5-250 microns may result in a stratified coating, in one embodiment, the film thickness may be in the range of 25-75 microns.

The coating composition of the present disclosure may be used for a variety of substrates, for example, plastics, metals (e.g., aluminum), glass and their molded products. More particularly, it may be used for automotive exterior and interior parts such as the body and doors, interior panels and consoles and the like.

The following examples are set forth for the purpose of explanation, and not limitation, to provide a thorough understanding of the present disclosure, including representative advantages thereof.

EXAMPLES

Example 1

Formulation and application of coating composition. 0.75 g of epoxy silsesquioxane dissolved in 67% tetrahydrofuran (THF) and isophorone diisocyanate (IPDI) trimer based dendrimer solution (34% in dimethylacetamide (DMA)) were weighed in a vial and stirred to produce a clear solution. 0.65 g hexane diisocyanate (HDI) (75% Desmodur N75), 1.5 g Lumiflon 200 and 0.25 g N,N-dimethylacetamide (DMA) were weighed and added to the same vial. The mixture was stirred until a homogenous mixture was obtained. A portion of the mixture was applied by pipette to a clean aluminum substrate to obtain a coating film by a drawdown box with a liquid thickness of 8 mL.

Example 2

Formulation and application of pigment dispersion. A pigment dispersion was prepared by mixing 22.7 g of isophorone diisocyanate (IPDI) trimer based dendrimer and 17.4 g of N,N-dimethylacetamide. 0.5 g of acrylic copolymer dispersing agent was added to the mixture, followed by 7.8 g of titanium dioxide ($TiO_2$) pigment. Acrylic copolymer dispersing agent, such as dipropylene glycol monomethyl ether, is a solution of an alkylolammonium salt of a polyfunctional polymer with anionic/non-ionic character (65% NV), supplied by BYK-Chemie (Wallingford, Conn.). $TiO_2$ pigments used supplied by were DuPont Ti-Pure R-960 and rutile $TiO_2$ from Sigma-Aldrich. A ball mill at 3000 rpm for 30-60 minutes was used to mix the pigment dispersion. This dispersion was then used in the coating formulation. Approximately 3.8 g of the pigment dispersion mixture was added to a vial. 3.06 g of epoxy silsesquioxane, dissolved at 67% in tetrahydrofuran (THF), and 3.0 g of Lumiflon 200 were added to the vial. 2.1 g of N,N-dimethylacetamide and 2.58 g of Desmodur N75BA (biuret of 1,6-hexamethylene diisocyanate (HDI)) from Bayer MaterialScience were added to the vial. The mixture was stirred until a homogenous mixture was obtained. A portion of the mixture was applied by pipette to a clean aluminum substrate to obtain a coating film by a drawdown box with a wet film thickness of 8 mil.

Example 3

Flash off and curing conditions. The mixture was flashed off at room temperature for 30 minutes. Some coating processes and applications require a flash off stage in which the coating is allowed to stand either at room temperature or at slightly elevated temperatures for a short period of time before baking at elevated temperatures. The flash-off times may vary depending on formulation and may be based on variables such as film thickness, ambient or oven temperatures, air current velocity, and diluents or solvents used in the coating. In general, a flash-off time in the range of approximately 2-15 minutes at ambient temperature may be applied to prepare coatings for further heat application. The film was then cured at 100° C. for 30 minutes. Subsequently, the film was cured at 120° C. for 30 minutes. In a typical application of an automotive coating, a basecoat is applied and allowed to flash off for approximately 5-10 minutes before the application of a clearcoat. The composite coating is then flashed off for another 5-10 minutes before entering into a bake oven.

Example 4

Test sample preparation. Samples were prepared for analysis by Scanning Electron Microscopy (SEM) and Energy Dispersive X-Ray (EDX). A steel panel was cut to obtain a slide approximately 2 cm in width. A homogeneous coating mixture was processed to afford stratified coatings on standard steel panels measuring 3 inches by 6 inches. To prepare panels for SEM and EDX analysis, the panels were cut into about 2 cm by 1 centimeter portions to produced slides. The coating slides were maintained at liquid nitrogen temperature measuring in the range of approximately −199 to −150° C. The slide was then inserted into liquid nitrogen and removed. The previous steps were repeated approximately 20 times until the slide reached a very cold temperature, such as approximately −175° C. The slide was bent to break the film into multiple pieces to result in cross-sectional surfaces. The samples or pieces of film were then transferred to a SEM stage stub with the cross-sectional surfaces facing upward. The stage stub with samples of film was placed in a chamber of sputter device, the Denton Vacuum DeskIV in the present procedure, and the samples were sputtered with gold particles to produce conductive samples.

Example 5

SEM and EDX Analysis. Scanning Electron Microscopy (SEM) instrumentation, the Hitachi SEM model 53400N with EDX spectrometer in the present procedure, was utilized to verify the stratified layers of the samples of film, as shown in FIG. 1. Through such analysis, a cross-section containing two layers was viewed. EDX analysis was then conducted to insure the elemental composites such as fluorine (F), silicon (Si), titanium (Ti), and oxygen (O) of each layer.

Example 6

EDX of stratified film 1. In FIG. 1, an EDX spectroscopy image depicts a stratified film produced by $TiO_2$ pigment in rutile form using an acrylic copolymer dispersing agent. The $TiO_2$ pigment is shown segregated to an upper layer of the stratified film.

Example 7

Figure 2:
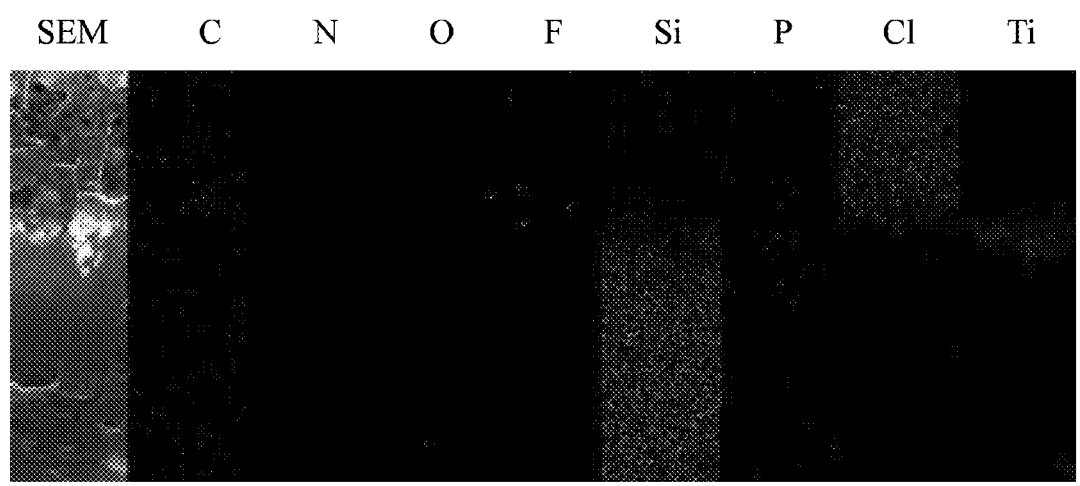
FIG. 2 is a photograph showing a result of elemental analysis of stratified film in an example 7 of the present disclosure.

EDX of stratified film 2. An EDX spectroscopy image shown in FIG. 2 depicts a stratified film produced by $TiO_2$ pigment in rutile form using a dispersing agent containing 50% solution of a partial amide and alkylammonium salt of a lower molecular weight unsaturated polycarboxylic acid polymer and polysiloxane copolymer in xylene/isobutanol. The $TiO_2$ pigment is shown proximate to the interface of two layers, but segregated mainly in the bottom layer of the stratified film.

Example 8

Figure 3:
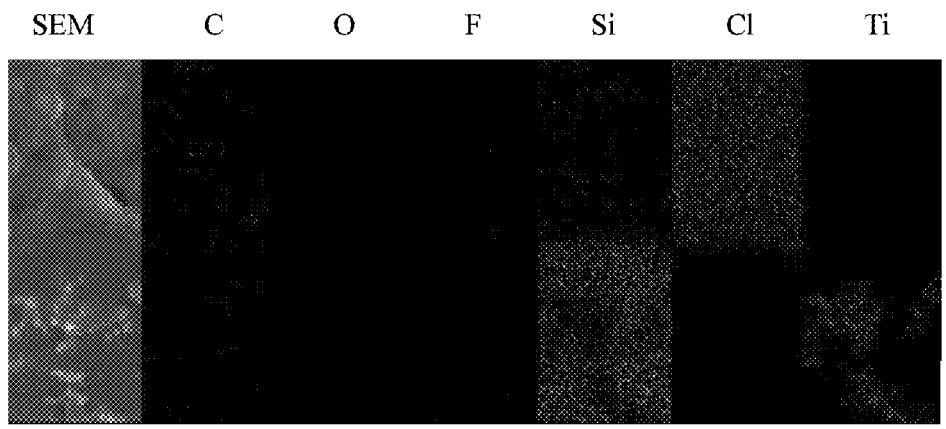
FIG. 3 is a photograph showing a result of elemental analysis of stratified film in an example 8 of the present disclosure.

EDX of stratified film 3. An EDX spectroscopy image depicts a stratified film produced by $TiO_2$ pigment in rutile form using a hydroxyl-functional carboxylic acid ester dispersing agent. The $TiO_2$ pigment, shown in FIG. 3, is shown segregated mainly in a bottom layer within the stratified film.

Example 9

Figure 4:
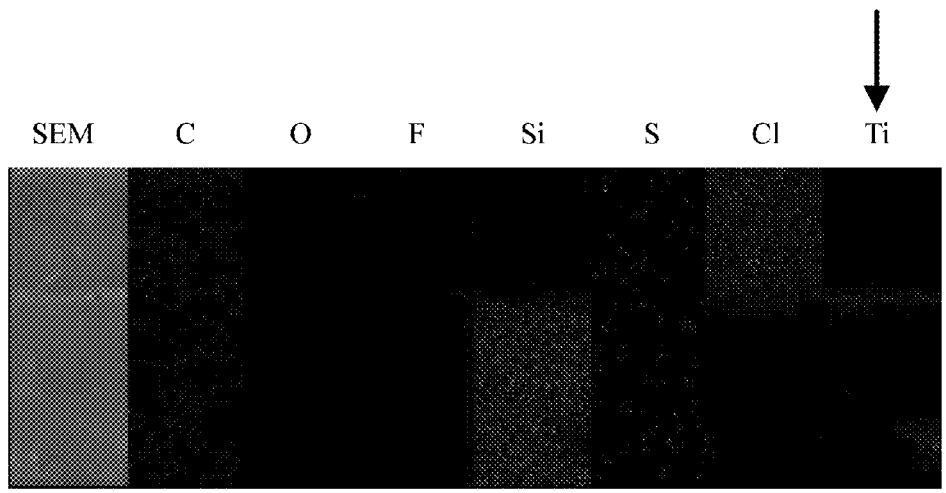
FIG. 4 is a photograph showing a result of elemental analysis of stratified film in an example 9 of the present disclosure.

EDX of stratified film 4. An EDX spectroscopy image shown in FIG. 4 depicts a stratified film produced by $TiO_2$ pigment in pure form using an acrylic copolymer dispersing agent. In addition, the pure $TiO_2$ pigment was produced with alumina and/or silica surface treatment. The $TiO_2$ pigment is shown segregated mainly in a bottom layer within the stratified film.

Example 10

Figure 5:
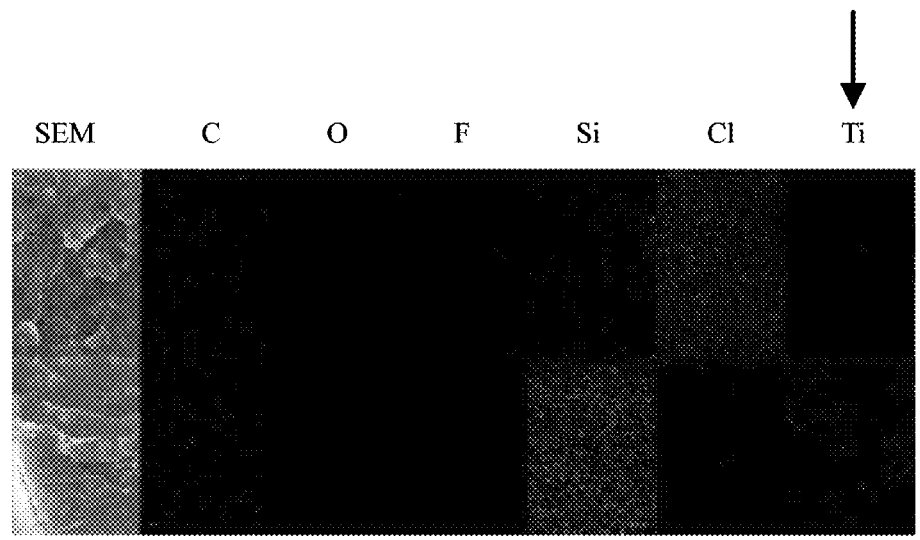
FIG. 5 is a photograph showing a result of elemental analysis of stratified film in an example 10 of the present disclosure.

EDX of stratified film 5. In FIG. 5, an EDX spectroscopy image depicts a stratified film produced by $TiO_2$ pigment in pure form using a dispersing agent containing 50% solution of a partial amide and alkylammonium salt of a lower molecular weight unsaturated polycarboxylic acid polymer and polysiloxane copolymer in xylene/isobutanol. In addition, the pure $TiO_2$ pigment was produced with alumina and/or silica surface treatment. The $TiO_2$ pigment is shown segregated mainly in a bottom layer within the stratified film.

Example 11

Figure 6:
FIG. 6 is a photograph showing a result of elemental analysis of stratified film in an example 11 of the present disclosure.

EDX of stratified film 6. An EDX spectroscopy image shown in FIG. 6 depicts a stratified film produced by $TiO_2$ pigment in pure form using a hydroxyl-functional carboxylic acid ester dispersing agent. In addition, the pure $TiO_2$ pigment was produced with alumina and/or silica surface treatment. The $TiO_2$ pigment is shown segregated mainly in a bottom layer within the stratified film.

Methods and processes discussed herein may provide a process of preparing a coating composition wherein the location of the pigment dispersed therein may be controlled. For example, it may be desirable that compositions which comprise at least one multifunctional layer (e.g., basecoat, clearcoat) may be produced with a pigmented layer preferably as a top or intermediate layer. Thus, the present disclosure provides methods by which the addition of varying amounts of dispersing agents or pigment surface treatment may direct the location of the pigmented layer within the coating composition. Further, the coating composition provided herein may preserve the attributes and characteristics found in typical coatings such as providing durability, ultraviolet (UV) light screening, high gloss and an overall simplified application.

Various methods and processes are contemplated including all or less than all of the steps described herein and/or mentioned above, any number of repeats or any of the steps shown and/or mentioned above, and performance of the steps in any order.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A coating composition comprising:
   a polyol, a silsesquioxane, a polyurethane dendrimer, a crosslinker, and a pigment in contact with a dispersing agent.

2. The composition of claim 1, wherein the polyol is selected from the group consisting of a fluorinated polyether polyol, a hydroxyl functional fluoroethylene-alkyl vinyl ether and a combination thereof.

3. The composition of claim 1, wherein the silsesquioxane is an epoxy functional silsesquioxane having a formula $(R)_6(C_6H_{11}O_2)_2(SiO_{1.5})_8$, wherein R is selected from the group consisting of hydrogen, methyl, ethyl, propyl, butyl, pentyl, hexyl, cyclopentyl, cyclohexyl, benzyl, and phenyl.

4. The composition of claim 1, wherein the polyurethane dendrimer is derived from the group consisting of isophorone diisocyanate (IPDI), isophorone triisocyanate. (IPTI ) and a combination thereof.

5. The composition of claim 1, wherein the crosslinker is an isocyanate-functional compound selected from the group consisting of hexamethylene diisocyanate (HDI), hexamethylene triisocyanate (HTI), methylene bis-(4-cyclohexyl isocyanate) (HMDI) and a combination thereof.

6. The composition of claim 1, wherein the dispersing agent is selected from the group consisting of dipropylene glycol methylether, a polycarboxylic acid polymer and polysiloxane copolymer solution, and a hydroxyl-functional carboxylic acid ester.

7. The composition of claim 1, wherein the pigment is surface-treated with a silane, silicon or aluminum compound.

8. A self-stratifying coating composition comprising:
   a coating mixture comprising a polyol, a silsesquioxane, a polyurethane dendrimer, and a crosslinker; and
   pigment particles in contact with a dispersing agent in an amount sufficient to stabilize location of the pigment particles in the coating mixture.

9. The composition of claim 8, wherein the polyol is selected from the group consisting of a fluorinated polyether polyol, a hydroxyl functional fluoroethylene-alkyl vinyl ether and a combination thereof.

10. The composition of claim 8, wherein the silsesquioxane is an epoxy functional silsesquioxane having a formula $(R)_6(C_6H_{11}O_2)_2(SiO_{1.5})_8$, wherein R is selected from the group consisting of hydrogen, methyl, ethyl, propyl, butyl, pentyl, hexyl, cyclopentyl, cyclohexyl, benzyl, and phenyl.

11. The composition of claim 8, wherein the polyurethane dendrimer is derived from the group consisting of isophorone diisocyanate (IPDI), isophorone triisocyanate (IPTI) and a combination thereof.

12. The composition of claim 8, wherein the crosslinker is an isocyanate-functional compound selected from the group consisting of hexamethylene diisocyanate (HDI), hexamethylene triisocyanate (HTI), methylene bis-(4-cyclohexyl isocyanate) (HMDI) and a combination thereof.

13. The composition of claim 8, wherein the dispersing agent is selected from the group consisting of dipropylene glycol methylether, a polycarboxylic acid polymer and polysiloxane copolymer solution, and a hydroxyl-functional carboxylic acid ester, 14. The composition of claim 8, wherein the pigment is surface-treated with a silane, silicon or aluminum compound.

15. A process for preparing a coating composition, the process comprising:
   contacting a polyol, a silsesquioxane, a polyurethane dendrimer, and a crosslinker to form a coating mixture dispersed within a solvent;
   adding a pigment in contact with a dispersing agent to the coating mixture; and
   forming a self-stratifying coating having at least one layer, wherein the pigment resides substantially within one of the at least one layer.

16. The process of claim 15, wherein the polyol is selected from the group consisting of a fluorinated polyether polyol, a hydroxyl functional fluoroethylene-alkyl vinyl ether and a combination thereof.

17. The process of claim 15, wherein the silsesquioxane is an epoxy functional silsesquioxane having a formula $(R)_6(C_6H_{11}O_2)_2(SiO_{1.5})_8$, wherein R is selected from the group consisting of hydrogen, methyl, ethyl, propyl, butyl, pentyl, hexyl, cyclopentyl, cyclohexyl, benzyl, and phenyl.

18. The process of claim 15, wherein the polyurethane dendrimer is derived from the group consisting of isophorone diisocyanate (IPDI), isophorone triisocyanate (IPTI), and a combination thereof.

19. The process of claim 15, wherein the crosslinker is an isocyanate-functional compound selected from the group consisting of hexarnethylene diisocyanate (HDI), hexamethylene. triisocyanate (HTI), methylene bis-(4-cyclohexyl isocyanate) (HMDI) and a combination thereof.

20. The process of claim 15, wherein the dispersing agent is selected from the group consisting of dipropylene glycol methylether, a polycarboxyllc acid polymer and polysiloxane copolymer solution,and a hydroxyl-functional carboxylic acid ester.

* * * * *